(12) United States Patent
Teratani

(10) Patent No.: US 7,350,384 B2
(45) Date of Patent: Apr. 1, 2008

(54) DOOR DEVICE EQUIPPED WITH LOCK

(75) Inventor: Kazumi Teratani, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 344 days.

(21) Appl. No.: 11/237,683

(22) Filed: Sep. 29, 2005

(65) Prior Publication Data

US 2006/0070416 A1    Apr. 6, 2006

(30) Foreign Application Priority Data

Oct. 1, 2004   (JP)   ............................ 2004-289750

(51) Int. Cl.
 *E05B 11/00*    (2006.01)
(52) U.S. Cl. .............................. 70/389; 70/390; 70/159
(58) Field of Classification Search .................. 70/389, 70/390, 159–162
See application file for complete search history.

(56) References Cited

U.S. PATENT DOCUMENTS

| 424,859 | A | * | 4/1890 | Corbett | ......................... | 70/389 |
|---|---|---|---|---|---|---|
| 429,795 | A | * | 6/1890 | Pusey | ............................. | 70/80 |
| 851,900 | A | * | 4/1907 | Scribner | ...................... | 70/389 |
| 2,953,012 | A | * | 9/1960 | Davis | ........................... | 70/100 |
| 4,337,987 | A | * | 7/1982 | Brooks et al. | .............. | 312/219 |
| 4,416,413 | A | * | 11/1983 | Chester | ......................... | 232/24 |
| 4,753,092 | A | * | 6/1988 | Mercer | ......................... | 70/389 |
| 4,942,748 | A | * | 7/1990 | McGough | ..................... | 70/389 |
| 5,819,563 | A | * | 10/1998 | Bianco | ...................... | 70/278.3 |
| 5,878,613 | A | * | 3/1999 | Tabacchi et al. | .............. | 70/389 |
| 6,658,903 | B1 | * | 12/2003 | McShane et al. | .............. | 70/63 |
| 7,051,563 | B2 | * | 5/2006 | Eckerdt | ......................... | 70/389 |

FOREIGN PATENT DOCUMENTS

JP    2003 074227    3/2003

* cited by examiner

*Primary Examiner*—Suzanne Dino Barrett
(74) *Attorney, Agent, or Firm*—Steptoe & Johnson LLP

(57) ABSTRACT

A door device equipped with a lock, which prevents forgetting to lock a door and the like, without an electrical warning device. The door device includes a lock allowing a rotating shaft to rotate between an opened position and a closed position by inserting and rotating a key and the key to be extracted only at the closed position, a cam rotating between the opened position and the closed position in linkage with the rotating shaft, and an oscillating strip oscillating between a first position and a second position, thereby contacting a door projection and moving to the first position when the door is closed while moving to the second position when the door is opened. An oscillating projection and a cam projection do not contact when the oscillating strip is in the first position, while they contact when the strip is in the second position. Thus, the cam rotation is suppressed and the lock rotation is restricted in the opened position.

2 Claims, 6 Drawing Sheets

DOOR DEVICE EQUIPPED WITH LOCK

BACKGROUND OF THE INVENTION

1. Field of the Invention

The present invention relates to a door device equipped with a lock designed to prevent forgetting to lock a door lock and the like.

2. Description of the Related Art

The conventional door device equipped with a lock resolves the problem of forgetting to lock the key or to take out the key and of forgetting to close the door with an electrical means (refer to, e.g., JP2003-74227A). FIGS. 6A and FIG. 6B show a configuration of a conventional door device equipped with a lock. In a locked state, a bolt 26 is positioned in the right direction, as shown in FIG. 6B. At this point, an operating bolt 20 and a stopper strip 28 integrally formed with the operating bolt 20 do not slide in the upward direction due to inhibition by the bolt 26. Since a handle (not shown) for opening the door is linked with the stopper strip 28, the door cannot be opened at this state. When a key is inserted into a cylinder lock (not shown) and turned from the external side of the door, the bolt 26 is moved toward the left, as shown in FIG. 6A. The operating bolt 20 and the stopper strip 28 then become freely slidable, and thus the handle can be turned allowing the door to open. When the bolt 26 is moved toward the left, a pin 42 arranged in the bolt 26 is pushed against a contact 36 of a first sensor 37. The unlocking is detected as an electrical signal, and a process of triggering a buzzer is performed through control by a CPU (not shown) so as to warn that locking and the like has been forgotten.

However, in the conventional door device equipped with a lock, due to the configuration of providing a warning by an electrical means, the purpose cannot be accomplished in blackout or battery shutoff.

SUMMARY OF THE INVENTION

The present invention, in view of the above problem, aims to provide a door device equipped with a lock, designed to allow prevention of forgetting to lock the door lock and the like without any electrical warning device.

The door device equipped with a lock of the present invention for solving the conventional problem comprises a door having a door projection provided on a back surface thereof, a panel having an opening for mounting therein the door, a lock mounted to the panel and having a rotating shaft, the rotating shaft being allowed to rotate between an opened position of the door and a closed position of the door by inserting and rotating a key, the key being allowed to be extracted only at the closed position of the door, a cam mounted to the rotating shaft of the lock and rotating between the opened position of the door and the closed position of the door in linkage with the rotating shaft, and an oscillating strip having an oscillating projection and oscillating between a first position and a second position, the strip contacting the door projection and moving to the first position when the door is closed and moving to the second position when the door is opened. When the oscillating strip is in the first position, the oscillating projection and a projection of the cam do not contact, and when the oscillating strip is in the second position, the oscillating projection and the projection of the cam contact to each other whereby the rotation of the cam is suppressed and the rotation of the lock is restricted in the opened position of the door.

According to the door equipped with a lock of the present invention, the opening and closing of the door and the rotation of the lock operate in linkage, wherein in the door opened state, the rotation of the lock is restricted and a key cannot be extracted from the lock, so that forgetting to lock is prevented.

DESCRIPTION OF THE PREFERRED EMBODIMENTS

The present invention is an invention relating to a door device equipped with a lock. The description is specifically provided with one example of application, where the present invention relates to a configuration of the door device equipped with a lock for preventing a memory card and the like used in a memory card recorder for a video device mounted on a special vehicle such as, a patrol car and the like from being stolen. It is needless to say that the present invention is obviously not limited to the relevant application.

The best mode for carrying out the present invention will now be described with reference to the drawings.

Figure 1:
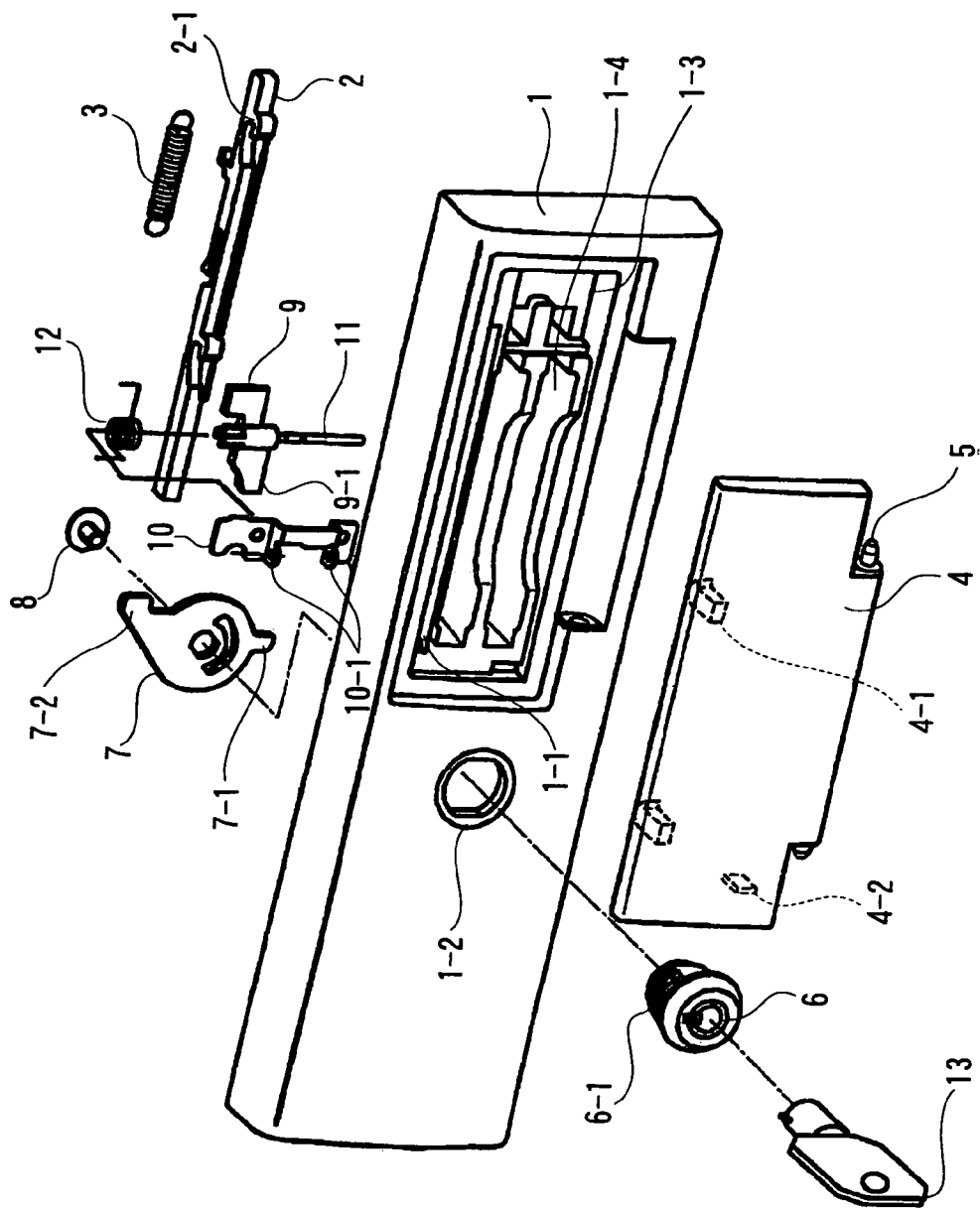
FIG. 1 is an exploded perspective view of a door device equipped with a lock according to an embodiment of the present invention.

FIG. 1 is an exploded perspective view of the door device equipped with a lock according to a first embodiment in which the present invention is applied to a card anti-theft door of the memory card recorder. In FIG. 1, an opening 1-3 is formed in a panel 1 of the memory card recorder (hereinafter referred to as panel). A slot 1-4 of two upper and lower sections for inserting the memory card is arranged in the opening 1-3. Recording/reproduction on/from the memory card is performed by inserting the memory card into the slot 1-4. Further, for anti-theft of the memory card, a door 4 is provided at the opening 1-3, which door 4 can be locked. The door 4 is arranged at the opening of the panel 1 so as to pivot about a door shaft 5.

A groove 1-1 is arranged on the upper end of the opening 1-3. A rod-shaped movement strip 2 is arranged on the rear surface side of the groove 1-1. A pair of nail receiving parts 2-1 of substantially C-shape is formed in the movement strip 2, which pair of nail receiving parts 2-1 is fitted into the groove 1-1. The movement strip 2 is slidably moved from side to side within a predetermined range. The movement strip 2 is biased in the left direction with a coil spring 3 when viewed from the front of FIG. 1. A pair of lock nails 4-1 is formed projecting on the rear surface side at the upper end of the back surface of the door. When the door 4 is closed, the lock nails 4-1 fit into the groove 1-1, and engage the nail receiving parts 2-1 of the movement strip 2 whereby the door 4 is in a closed state and the turning of the door 4 is restricted.

A lock 6 to where a key 13 can be inserted and taken out only at a predetermined turned position (hereinafter referred to as a lock, and the description of the configuration thereof is omitted as it is a known technique) has a screw part 6-1 inserted to a lock hole 1-2 arranged on the left side of the opening of the panel 1, and is fixed with a nut (not shown) from the back surface so that a rotating shaft (not shown) is in the vertical direction with respect to the panel 1. A cam 7 is fixed to the rotating shaft of the lock 6 with a screw 8. The cam 7 is plate-shaped, and a projection 7-1 to where an oscillating projection 9-1 to be hereinafter described contacts and a pushing part 7-2 for pushing the end of the movement strip 2 are formed on the outer periphery of the cam 7. The lock 6 includes a rotating shaft, which rotating shaft (and the cam 7 linked therewith) is turned between an opened position of the door of when the door 4 is opened and the closed position of the door of when the door is closed and locked by inserting and rotating the key 13. In FIG. 1, the end face on the left side of the movement strip 2 is biased in the left direction and contacted to the pushing part 7-2 of the cam 7.

The oscillating shaft 11 is arranged in the up and down direction between the opening 1-3 and the lock hole 1-2 of the back surface of the panel 1, and is pivotally supported at the shaft hole 10-1 of a fitting 10 fixed to the back surface of the panel 1. An oscillating strip 9 and an oscillating projection 9-1 are configured integral with the oscillating shaft 11. The fitting 10 has the central part bent to a U-shaped, and both ends 10-2 are fixed to the back surface of the panel 1 with the screw 15. As shown in FIG. 1, a pair of shaft holes 10-1 is formed so as to oppose each other at the ends of the fitting 10 bent to a U-shape, and formed so as to pivotally support the oscillating shaft 11 vertically.

The oscillating strip 9 and the oscillating projection 9-1 oscillate in a front and back direction (direction of rotating shaft of the lock 6) between a first position (FIG. 5A) and a second position (FIG. 5B) to be hereinafter described with the oscillating shaft 11 as the center. The oscillating strip 9 contacts the door projection 4-2 arranged at the back surface of the door by being oscillated. The oscillating projection 9-1 contacts the projection 7-1 arranged at the cam 7 by being oscillated. The oscillating strip 9 and the oscillating projection 9-1 are configured so as to be biased in a right turning (clockwise) direction with a torsion spring 12, and in a state without any restriction, rest at the second position by the biasing force of the torsion spring 12.

The operations of the door equipped with a lock according to the embodiment configured above will now be explained using FIG. 2 to FIG. 4, FIG. 5A, and FIG. 5B.

Figure 2:
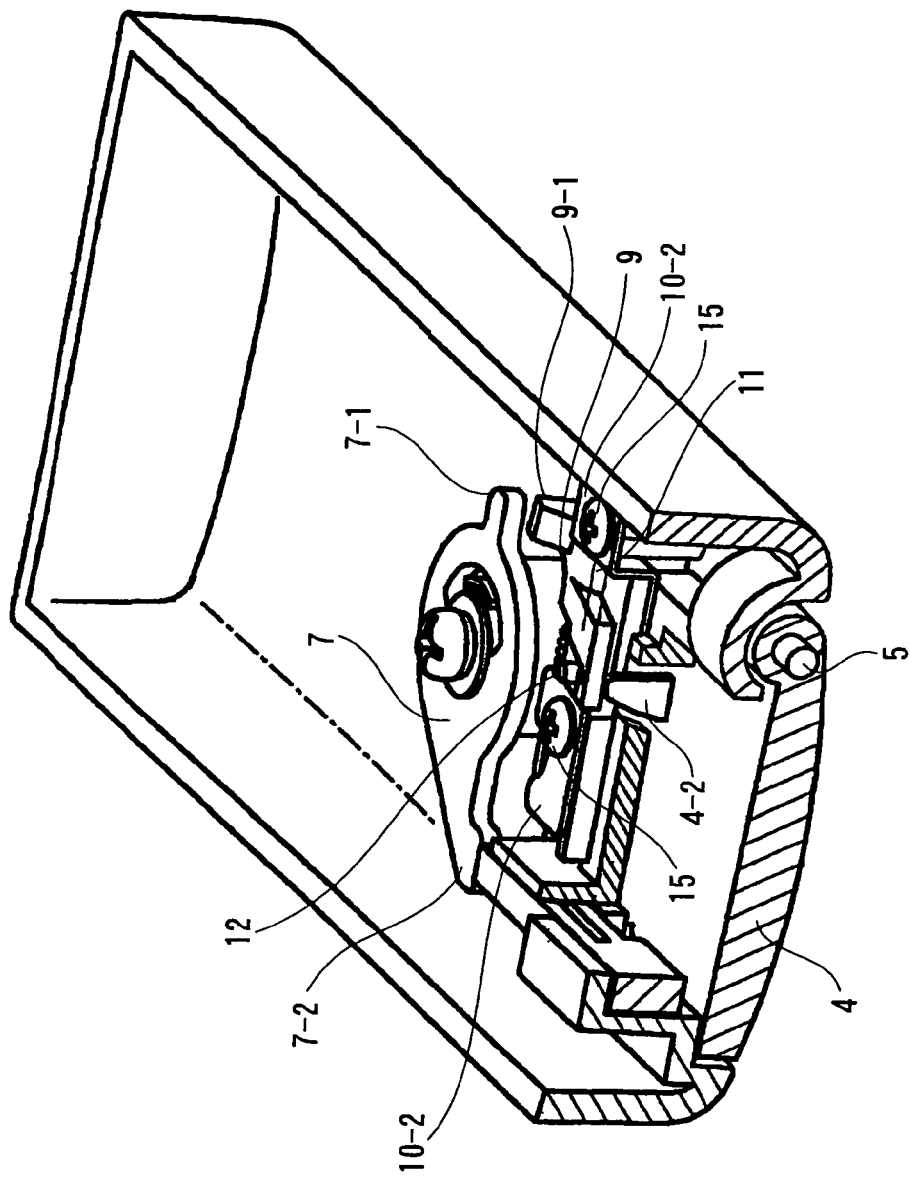
FIG. 2 is a partial cross sectional view showing an operation of an oscillating strip in a door closed state of the door device equipped with a lock according to the embodiment of the present invention.
Figure 5A:
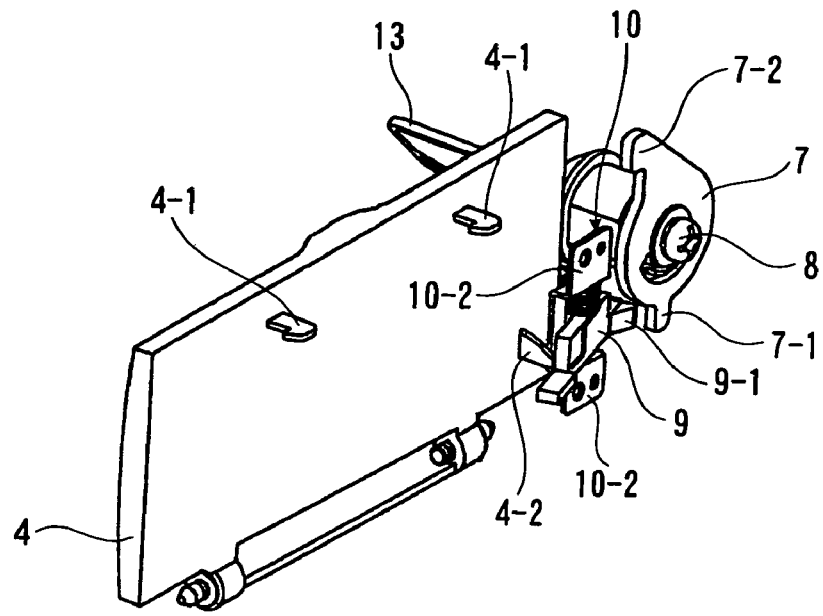
FIGS. 5A and 5B are perspective views each illustrating the operation of the oscillating strip.

The closed state of the door will first be explained as an initial state. FIG. 2 is a partial cross sectional view showing the operation of the oscillating strip 9 in the door closed state, and FIG. 5A is a perspective view of the main part on the rear surface side in the door closed state. In a state the door 4 is closed, the door projection 4-2 pushes the oscillating strip 9 in a direction away from the door 4 against the biasing force of the torsion spring 12, and thus the oscillating strip 9 is rotated with the oscillating shaft 11 as the center and comes to a rest at the first position. Of the oscillating strip 9, the oscillating projection 9-1 is formed on the rear surface of the end different from the side contacting the door projection 4-2. In a state the oscillating strip 9 is in the first position, since the oscillating projection 9-1 is moved backward to (not contacting) the rear surface side of the panel 1 from the rotating trajectory of the projection 7-1 of the cam 7, the cam 7 is in a state freely rotatable with respect to the oscillating projection 9-1. On the other hand, the cam 7 is pushed in the clockwise direction in FIG. 2 by the end of the movement strip 2 biased by the coil spring 3 As a result, and the lock 6 linking with the cam 7 is in a rotating state up to the position (door closed position) where the key 13 can be freely inserted and extracted. It is to be noted that FIG. 5A shows a state before the lock 6 is in the door closed position.

Figure 3:
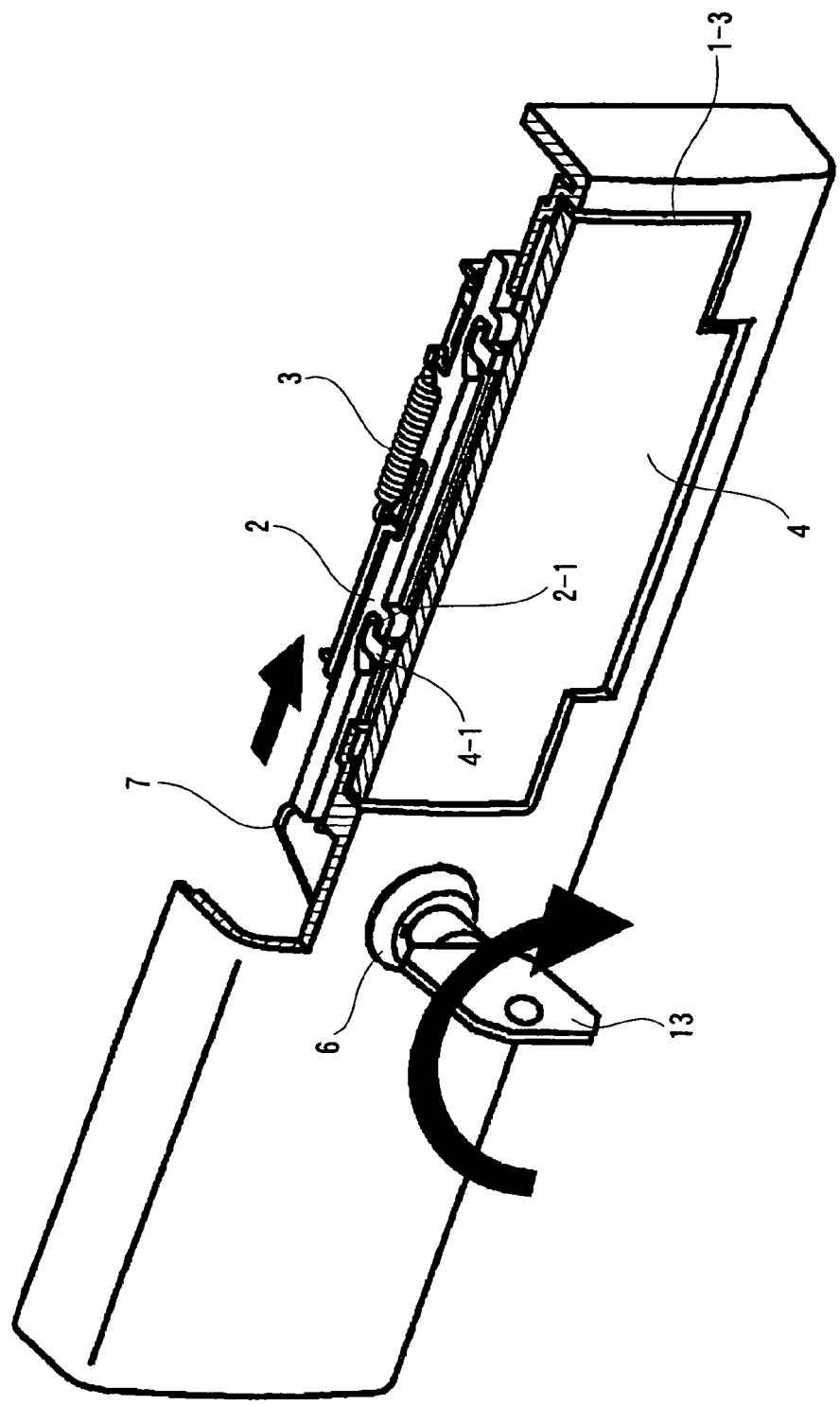
FIG. 3 is a partial cross sectional view showing an opening and closing operation of a key with respect to a door in the door device equipped with a lock according to the embodiment of the present invention.

The operation of opening the door with the key will now be explained. FIG. 3 is a partial cross sectional view showing the turning of the key 13 and the opening and closing related operations of the door 4. When the key 13 is inserted into the lock 6 and rotated to the door opened position in a direction of the arrow of a semicircle in FIG. 3, the cam 7 fixed to the rotating shaft of the lock 6 pushes the end of the movement strip 2 against the biasing force of the coil spring 3. The pushed movement strip 2 is moved toward the right, and the engagement of the nail receiving parts 2-1 of the movement strip 2 and the lock nails 4-1 of the door 4 is released thereby allowing the door 4 to open. The movement strip 2 is stopped in a state pushed by the cam 7 and moved to the right direction.

Figure 4:
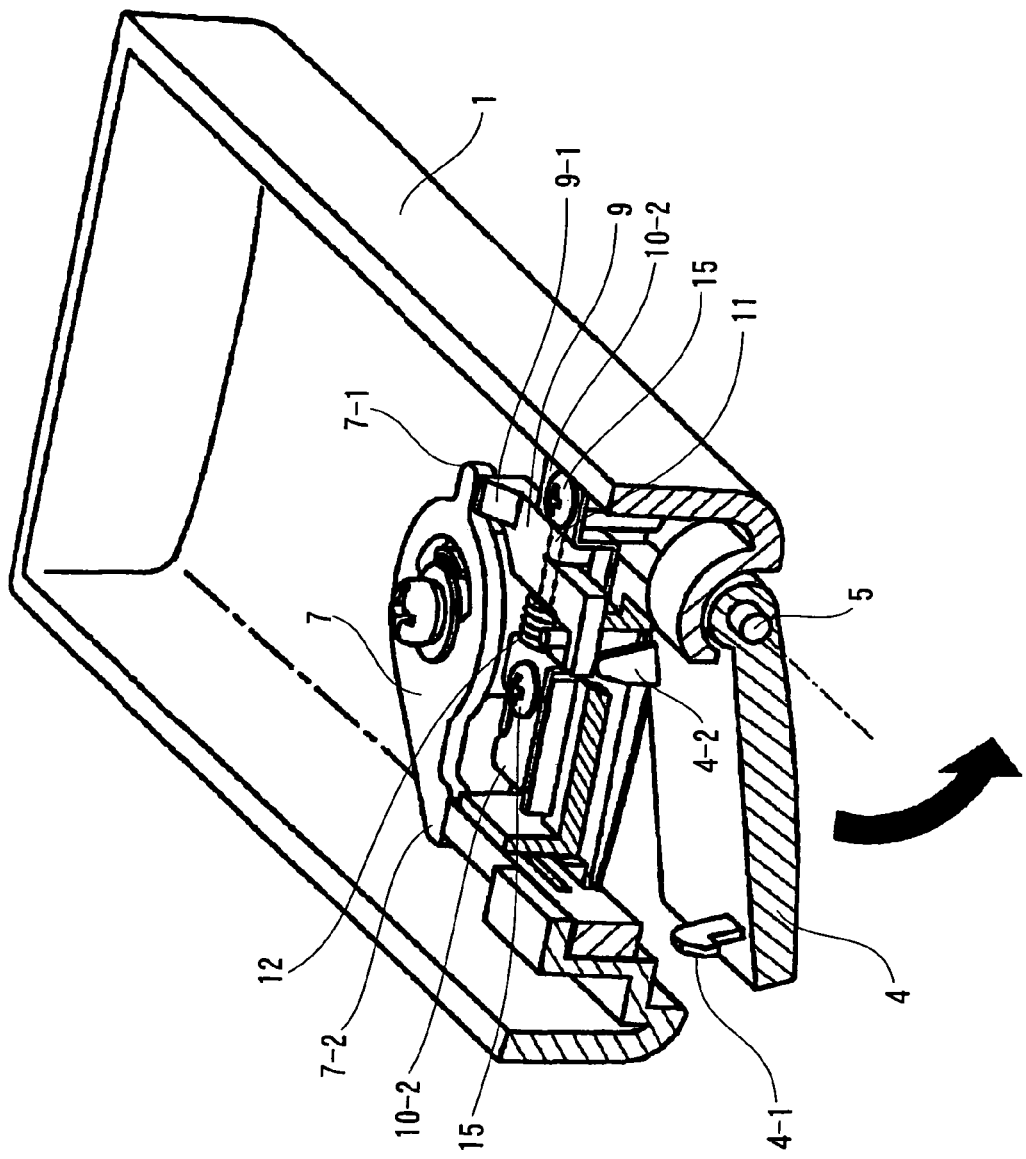
FIG. 4 is a partial cross sectional view showing an operation of the oscillating strip in a door opened state of the door device equipped with a lock according to the embodiment of the present invention.
Figure 5B:
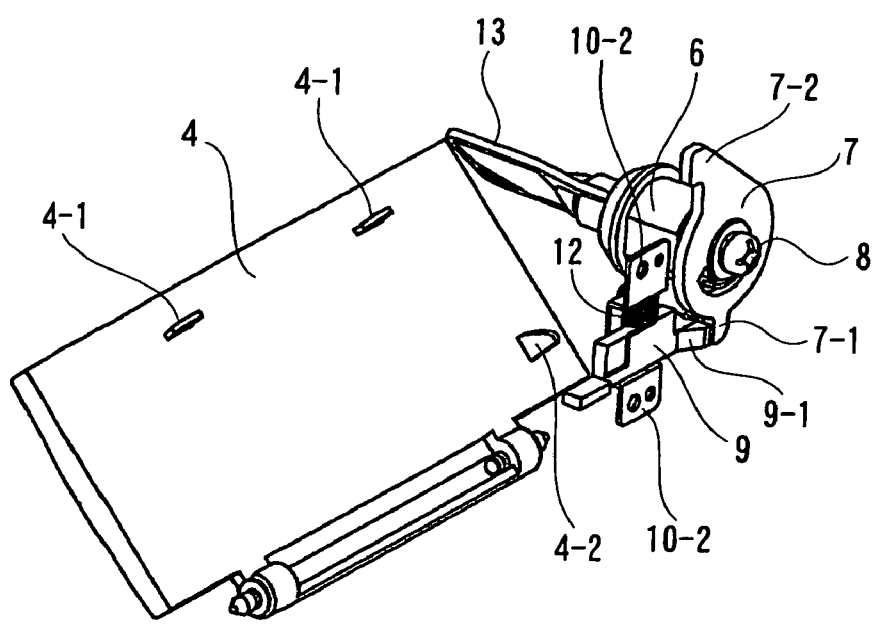
Figure 6A:
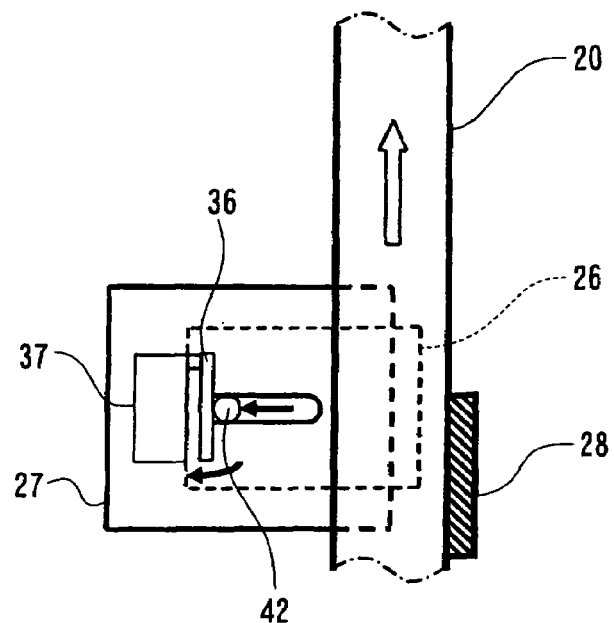
FIGS. 6A and 6B are configuration views each of a detecting part of a conventional door device equipped with a lock.
Figure 6B:
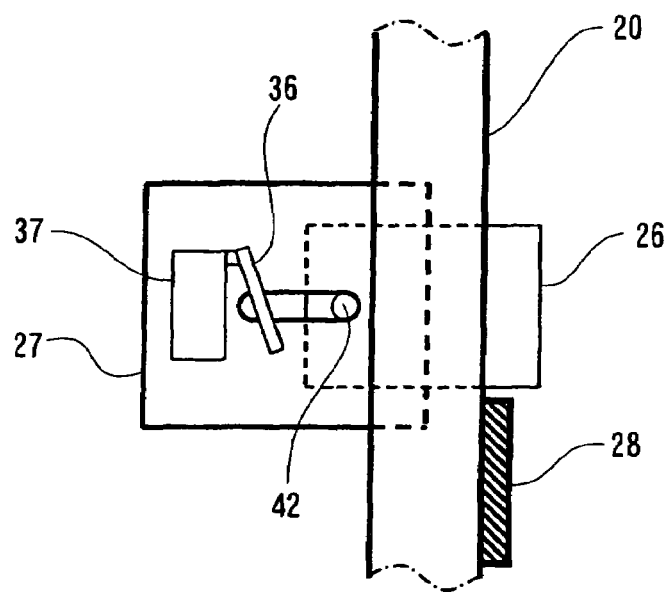

FIG. 4 is a partial cross sectional view showing the operation of the oscillating strip 9 in the door opened state and FIG. 5B is a perspective view of the main part on the rear surface side of the door opened state. When the door 4 is opened, the door projection 4-2 is turned and moved backward in a direction of the arrow of FIG. 4 with the door shaft 5 as the turning center. The oscillating strip 9 is, in the door closed state, biased in a direction of the door projection 4-2 by the torsion spring 12, thereby contacting the door projection 4-2 and coming to a rest at the first position. However, when the door 4 is opened, the oscillating strip 9 is turned in the clockwise direction with the oscillating shaft 11 as the center thereby coming to a rest at the second position in synchronization with the backward movement of the door projection 4-2. When the oscillating strip 9 is oscillated to the second position with the opening of the door 4, the oscillating projection 9-1 moves within the rotating trajectory of the projection 7-1 of the cam 7, and thus the rotation of the cam 7 is suppressed in the door opened position.

When the door 4 is opened through such operations, the rotation of the lock 6 is restricted at the door opened position, and as a result, the key 13 cannot be extracted from the lock 6 in the door opened state. That is, the key 13 is always in a state inserted to the lock 6 when the door 4 is opened.

The operation of again closing the door 4 will now be explained. When closing the door 4, the door projection 4-2 pushes the oscillating strip 9 from the rear surface side. The oscillating strip 9 is rotated to the first position with the oscillating shaft 11 as the center by being pushed by the door projection 4-2, and thus the oscillating projection 9-1 is deviated from the rotating trajectory of the projection 7-1 of the cam 7, and the engagement between the oscillating projection 9-1 and the projection 7-1 is released, allowing the cam 7 to be freely rotatable. As a result, the movement strip 2, which movement has been inhibited by the pushing part 7-2 of the cam 7, is moved toward the left by the biasing force in the left direction of the coil spring 3, and the cam 7 is pushed by the end of the movement strip 2 and is rotated to the closed position of the door.

Further, when the door 4 is closed, the nail receiving parts 2-1 of the movement strip 2 moved in the left direction and the inclined part of the lock nails 4-1 of the door 4 are pressure contacted, and the lock nails 4-1 move the movement strip 2 in the right direction thereby engaging the lid 4 with the bias of the coil spring 3, which part is a known technique and thus the detailed explanation thereof is omitted.

When the door 4 is closed through the above operations, the lock 6 is rotated to the door closed position and enters the locked state, at which state the key 13 can be extracted from the lock 6.

According to the above configuration, when the door is opened, the rotation of the lock 6 is restricted at the door opened position, and as a result, the key 13 cannot be extracted from the lock 6 in the door opened state. That is, in a state the door 4 is opened, the key 13 is always in a state inserted into the lock 6. Further, when the door is closed, the lock 6 is rotated to the door closed position and enters the locked state and the key 13 can be extracted from the lock 6. Thus, the situation of forgetting to lock the door by putting away the key 13 or misplacing the key 13 while the door 4 is opened does not occur. Since the key 13 cannot be extracted from the lock 6 unless in the door closed state, the forgetting of locking is prevented.

In the present embodiment, the door 4, the lock nails 4-1 and the door projection 4-2 are integrally formed, but the lock nails 4-1 and the door projection 4-2 may be separate components to be engaged to the door.

The door device equipped with a lock according to the present invention is effective for preventing, without arranging an electrical warning device, from forgetting to lock the door lock and the like by having the key extracted from the lock only in the door closed state with a simple configuration of reduced number of components.

What is claimed is:

1. A door device equipped with a lock, comprising:
    a door having a door projection provided on a back surface thereof;
    a panel having an opening for mounting therein said door;
    a lock mounted to said panel and having a rotating shaft, said rotating shaft being allowed to rotate between an opened position of the door and a closed position of the door by inserting and rotating a key, said key being allowed to be extracted only at the closed position of the door;
    a cam mounted to the rotating shaft of said lock and rotating between the opened position of the door and the closed position of the door in linkage with said rotating shaft; and
    an oscillating strip having an oscillating projection and oscillating between a first position and a second position, said strip contacting said door projection and moving to the first position when said door is closed and moving to the second position when said door is opened, wherein
    when said oscillating strip is in the first position, the oscillating projection and a projection of said cam do not contact, and when said oscillating strip is in the second position, the oscillating projection and the projection of said cam contact to each other whereby the rotation of said cam is suppressed and the rotation of said lock is restricted in the opened position of the door.

2. The door equipped with a lock according to claim 1, wherein said door further has a lock nail provided on the back surface thereof, and said door equipped with a lock further comprises a movement strip having a nail receiving part for engaging with said lock nail, said strip moving by contacting said cam and being pushed by said cam when the cam is rotated to the opened position of said door, wherein
    when said lock is at the opened position of the door, said cam moves said movement strip to release the engagement of the nail receiving part and the lock nail thereby to open said door, the door projection of said door is moved backward to move the oscillating strip and the oscillating projection to the second position, and the projection of said cam contacts said oscillating projection to suppress the rotation of said cam, and
    when said door is closed, the door projection pushes the oscillating strip to move the oscillating strip and the oscillating projection to the first position, thereby releasing the engagement of the oscillating projection and the projection of said cam, and said lock is rotated to the closed position of the door.

* * * * *